(12) United States Patent
Wallman et al.

(10) Patent No.: US 9,504,989 B2
(45) Date of Patent: Nov. 29, 2016

(54) MONOLITHIC CONTACTOR AND ASSOCIATED SYSTEM AND METHOD FOR COLLECTING CARBON DIOXIDE

(71) Applicant: The Boeing Company, Chicago, IL (US)

(72) Inventors: Daniel J. Wallman, Agoura Hills, CA (US); D. Anthony Galasso, Trabuco Canyon, CA (US); Jon A. Magnuson, Corona del Mar, CA (US); Gary D. Grayson, Huntington Beach, CA (US); Tab H. Crooks, Dana Point, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 14/725,427

(22) Filed: May 29, 2015

(65) Prior Publication Data

US 2015/0258529 A1 Sep. 17, 2015

Related U.S. Application Data

(62) Division of application No. 13/767,198, filed on Feb. 14, 2013, now Pat. No. 9,073,001.

(51) Int. Cl.
*B01D 53/02* (2006.01)
*B01J 20/30* (2006.01)
(Continued)

(52) U.S. Cl.
CPC ............ *B01J 20/3007* (2013.01); *B01D 53/04* (2013.01); *B01D 53/0407* (2013.01); *B01J 20/02* (2013.01); *B01J 20/08* (2013.01); *B01J 20/103* (2013.01); *B01J 20/18* (2013.01); *B01J 20/183* (2013.01); *B01J 20/22* (2013.01);
(Continued)

(58) Field of Classification Search
CPC .................. B01D 2253/108; B01D 2253/116; B01D 2253/342; B01D 2257/504; B01D 2257/80; B01D 53/04; B01D 53/0407; B01J 20/02; B01J 20/08; B01J 20/103; B01J 20/18; B01J 20/183; B01J 20/22; B01J 20/28011; B01J 20/28045; B01J 20/3007; B01J 20/3078; Y02C 10/08; Y10T 428/24744
See application file for complete search history.

(56) References Cited

U.S. PATENT DOCUMENTS 3,359,707 A 12/1967 Louis
3,493,339 A 2/1970 Wheldon et al.
(Continued)

FOREIGN PATENT DOCUMENTS

DE 4003533 2/1990
DE 4003533 8/1990
(Continued)

OTHER PUBLICATIONS

Amato et al., "Methane Oxycombustion for Low CO2 Cycles: Blowoff Measurements and Analysis," *Journal of Engineering for Gas Turbines and Power*, vol. 133 (2011).
(Continued)

*Primary Examiner* — Christopher P Jones
(74) *Attorney, Agent, or Firm* — Walters & Wasylyna LLC (57) ABSTRACT

A monolithic contactor for collecting target molecules, the monolithic contactor may include a monolithic body having an inlet end and a longitudinally opposed outlet end and a plurality of cells extending from proximate the inlet end to proximate the outlet end, wherein the target molecules are adsorbed to a surface of the body.

20 Claims, 6 Drawing Sheets (51) Int. Cl.
*B01D 53/04* (2006.01)
*B01J 20/18* (2006.01)
*B01J 20/02* (2006.01)
*B01J 20/08* (2006.01)
*B01J 20/10* (2006.01)
*B01J 20/22* (2006.01)
*B01J 20/28* (2006.01)

(52) U.S. Cl.
CPC ... *B01J 20/28011* (2013.01); *B01J 20/28045* (2013.01); *B01J 20/3078* (2013.01); *B01D 2253/108* (2013.01); *B01D 2253/116* (2013.01); *B01D 2253/342* (2013.01); *B01D 2257/504* (2013.01); *B01D 2257/80* (2013.01); *Y02C 10/08* (2013.01); *Y10T 428/24744* (2015.01)

(56) References Cited

U.S. PATENT DOCUMENTS

| | | |
|---|---|---|
| 3,660,967 A | 5/1972 | Collins et al. |
| 3,853,507 A | 12/1974 | Monroe et al. |
| 4,094,652 A | 6/1978 | Lowther |
| 4,249,915 A | 2/1981 | Sircar et al. |
| 4,312,641 A | 1/1982 | Verrando et al. |
| 4,322,394 A | 3/1982 | Mezey et al. |
| 4,484,933 A | 11/1984 | Cohen |
| 4,551,197 A | 11/1985 | Guilmette et al. |
| 4,726,815 A | 2/1988 | Hashimoto et al. |
| 4,784,672 A | 11/1988 | Sircar |
| 4,797,141 A | 1/1989 | Mercader et al. |
| 4,832,711 A | 5/1989 | Christel et al. |
| 5,059,405 A | 10/1991 | Watson et al. |
| 5,100,635 A | 3/1992 | Krishnamurthy et al. |
| 5,221,520 A | 6/1993 | Cornwell |
| 5,232,474 A | 8/1993 | Jain |
| 5,233,837 A | 8/1993 | Callahan |
| 5,261,250 A | 11/1993 | Missimer |
| 5,282,886 A | 2/1994 | Kobayashi et al. |
| 5,749,230 A | 5/1998 | Coellner |
| 6,022,399 A | 2/2000 | Ertl et al. |
| 6,027,548 A | 2/2000 | Ackley et al. |
| 6,183,539 B1 | 2/2001 | Rode et al. |
| 6,293,999 B1 | 9/2001 | Cheng et al. |
| 6,332,925 B1 | 12/2001 | Noji et al. |
| 6,337,063 B1 | 1/2002 | Rouleau et al. |
| 6,502,328 B1 | 1/2003 | Love et al. |
| 6,621,848 B1 | 9/2003 | Ullman et al. |
| 6,706,097 B2 | 3/2004 | Zornes |
| 6,712,879 B2 | 3/2004 | Kato et al. |
| 7,736,416 B2 | 6/2010 | Nalette et al. |
| 7,947,120 B2 | 5/2011 | Deckman et al. |
| 8,435,335 B2 | 5/2013 | Lam et al. |
| 2001/0009124 A1 | 7/2001 | Suzuki et al. |
| 2005/0121393 A1 | 6/2005 | Galbraith |
| 2006/0185335 A1* | 8/2006 | Ichikawa ........... B01D 46/0001 55/523 |
| 2007/0231233 A1 | 10/2007 | Bose |
| 2008/0200742 A1 | 8/2008 | Doyle et al. |
| 2008/0314245 A1 | 12/2008 | Hershkowitz et al. |
| 2009/0232861 A1 | 9/2009 | Wright et al. |
| 2009/0294366 A1 | 12/2009 | Wright et al. |
| 2009/0311146 A1 | 12/2009 | Ohno et al. |
| 2010/0000221 A1 | 1/2010 | Pfefferle |
| 2010/0024476 A1 | 2/2010 | Shah |
| 2010/0251887 A1 | 10/2010 | Jain |
| 2010/0251937 A1 | 10/2010 | Murray et al. |
| 2010/0284904 A1 | 11/2010 | Castaldi et al. |
| 2011/0088550 A1 | 4/2011 | Tirio |
| 2011/0107914 A1 | 5/2011 | Su et al. |
| 2011/0189075 A1 | 8/2011 | Wright et al. |
| 2011/0247491 A1 | 10/2011 | Leitgeb et al. |
| 2011/0296872 A1 | 12/2011 | Eisenberger |
| 2012/0000365 A1 | 1/2012 | Okano et al. |
| 2012/0017638 A1 | 1/2012 | Prast et al. |
| 2012/0048111 A1 | 3/2012 | Nakao et al. |
| 2012/0204720 A1 | 8/2012 | Tschantz et al. |
| 2013/0047664 A1 | 2/2013 | DiCenzo |
| 2013/0192296 A1 | 8/2013 | Betting et al. |
| 2014/0053761 A1 | 2/2014 | Galasso |

FOREIGN PATENT DOCUMENTS

| | | |
|---|---|---|
| GB | 2171927 | 9/1986 |
| WO | WO 2012/013596 | 2/2012 |
| WO | WO 2012/030223 | 3/2012 |
| WO | WO 2013/010328 | 1/2013 |

OTHER PUBLICATIONS

Smardzewski et al., "A Laboratory Study of the Dielectric Heating of Molecular Sieve Materials," *Naval Research Laboratory* (1980).

Choi et al., "Adsorbent Materials for Carbon Dioxide Capture from Large Anthropogenic Sources," *ChemSusChem Journal*, vol. 2, pp. 796-854 (2009).

Konduru et al., "Curbing Greenhouse Effect by Carbon Dioxide Adsorption with Zeolite 13x," *AIChe Journal*, vol. 53, No. 12 (2007).

Cavenati et al., "Adsorption Equilibrium of Methane, Carbon Dioxide, and Nitrogen on Zeolite 13x at High Pressures," Journal of Chemical Engineering Data, vol. 49, pp. 1095-1101 (2004).

Siemons et al., "Assessing the Kinetics and Capability of Gas Adsorption in Coals by a Combined Adsorption/Diffusion Method," *SPE Annual Technical Conference and Exhibition* (Denver, CO, 2003).

* cited by examiner

MONOLITHIC CONTACTOR AND ASSOCIATED SYSTEM AND METHOD FOR COLLECTING CARBON DIOXIDE

PRIORITY

This application is a divisional of, and claims priority from, U.S. Ser. No. 13/767,198 filed on Feb. 14, 2013, the entire contents of which are incorporated herein by reference.

FIELD

The present disclosure is generally related to carbon dioxide collection and, more particularly, to the use of a monolithic contactor made from a zeolite material to collect carbon dioxide.

BACKGROUND

Carbon dioxide is collected for a variety of applications. Natural sources of carbon dioxide are commonly mined to collect carbon dioxide for various industrial purposes. Carbon dioxide is also collected as a byproduct of industrial processes and to remove excess carbon dioxide from a supply of air.

Carbon dioxide may be obtained from various sources using various techniques. However, traditional carbon dioxide collection techniques may be very energy intensive, particularly when run on an industrial scale. The two most demanding energy requirements for carbon dioxide collection are typically the energy required to drive a gas stream past or through a collecting medium and the energy required to regenerate and capture the carbon dioxide from the collecting medium. Therefore, carbon dioxide material costs may become significant, particularly when large quantities are used.

A common method for collecting carbon dioxide is the use of amines to chemically bond carbon dioxide. Such methods involve chemical reactions and require significant energy to release the carbon dioxide from the amines.

Another method for collecting carbon dioxide is the use of sodium carbonate as a catalyst in which an air stream is introduced to a liquid sodium hydroxide stream to produce carbonate salts. Such methods require significant energy because the carbonate salts need to be heated to very high temperatures to release the captured carbon dioxide.

Another method of collecting carbon dioxide is the use of a packed bed of zeolite powder or zeolite spherical extrudates. Such methods also require significant energy to drive the gas stream through the packed bed of zeolite material.

Accordingly, those skilled in the art continue with research and development efforts in the field of carbon dioxide collection.

SUMMARY

In one embodiment, the disclosed system may include a monolithic contactor for collecting target molecules, the monolithic contactor may include a monolithic body having an inlet end and a longitudinally opposed outlet end and a plurality of cells extending from proximate the inlet end to proximate the outlet end, wherein the target molecules are adsorbed to a surface of the body.

In another embodiment, the disclosed system may include a system for collecting target molecules, such as water and carbon dioxide, from a process gas, the system may include a condenser for removing heat from the process gas, wherein the condenser condenses water vapor in the process gas, a desiccant chamber for adsorbing additional water from the process gas to produce substantially dry gas, a contact chamber for adsorbing carbon dioxide from the dry gas. The disclosed system may optionally also include a vacuum chamber for evacuating the adsorbed carbon dioxide from the contact chamber and transitioning the evacuated carbon dioxide from a gas to a solid, such as through sublimation, and a heat transfer assembly for collecting the heat removed from the process gas and transferring the heat.

In yet another embodiment, disclosed is a method of making a monolithic contactor for collecting target molecules, the method may include the steps of: (1) preparing an adsorbent composition comprising an adsorbent material (e.g., a zeolite material), a carrier, and a binder, (2) extruding the adsorbent composition to form a monolithic body having an inlet end, a longitudinally opposed outlet end, and a plurality of substantially parallel cells extending from proximate the inlet end to proximate the outlet end, (3) drying the body, and (4) fire drying the body.

In yet another embodiment, disclosed is a method for collecting carbon dioxide, the method may include the steps of: (1) providing a gaseous mixture including carbon dioxide and water, and (2) adsorbing at least a portion of the carbon dioxide from the gaseous mixture onto a monolithic contactor, the monolithic contactor including an adsorbent material assembled as a monolithic body defining a plurality of channels.

Other aspects of the disclosed monolithic contactor, system and method will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
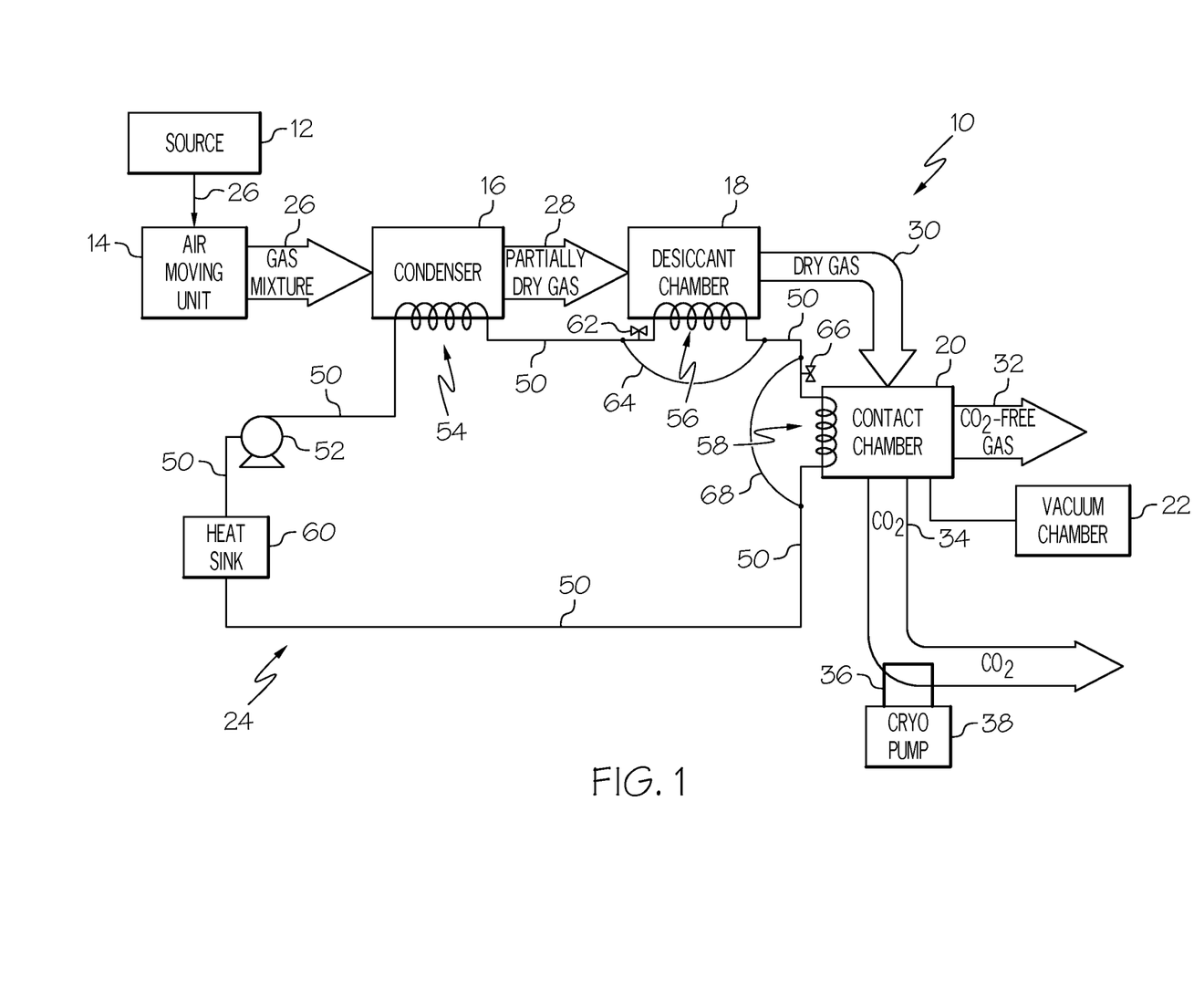
FIG. 1 is a schematic block diagram of an embodiment of the disclosed system for collecting carbon dioxide.

Referring to FIG. 1, one embodiment of the disclosed system for collecting carbon dioxide, generally designated 10, may include a gas source 12, an air moving unit 14, a condenser 16, a desiccant chamber 18 and a contact chamber 20. Optionally, the system 10 may also include a vacuum chamber 22 and/or a heat transfer assembly 24. Additional components and subsystems may be incorporated into the system 10 without departing from the scope of the present disclosure.

The gas source 12 may be a source of process gas 26. The process gas 26 may be any carbon dioxide-containing gas. For example, the process gas 26 may be a gaseous mixture, and may include carbon dioxide as well as other constituents, such as water vapor, nitrogen, oxygen, rare gases, and the like.

The process gas 26 may be at an elevated temperature relative to ambient conditions such that the process gas 26 contains excess heat. In one expression, the process gas 26 may be at a temperature of at least 25° C. In another expression, the process gas 26 may be at a temperature of at least 50° C. In another expression, the process gas 26 may be at a temperature of at least 100° C. In another expression, the process gas 26 may be at a temperature of at least 200° C. In another expression, the process gas 26 may be at a temperature of at least 300° C. In another expression, the process gas 26 may be at a temperature of at least 400° C. In yet another expression, the process gas 26 may be at a temperature of at least 500° C.

In one particular implementation, the gas source 12 may be a power plant and the process gas 26 may be the effluent from the power plant. For example, the power plant may be a hydrocarbon-burning power plant, such as a natural gas power plant, and the process gas 26 may be the combustion byproducts of the hydrocarbon-burning power plant. Therefore, the process gas 26 may be at a relatively high temperature relative to ambient conditions, and may include significant quantities of carbon dioxide as a result of the combustion reaction of oxygen with the hydrocarbon. Optionally, separating devices, such a scrubbers, may be used between the gas source 12 and the air moving unit 14 to remove contaminants (e.g., metals) from the effluent before the process gas 26 enters the system 10.

The air moving unit 14, while optional, may facilitate the transfer of the process gas 26 from the gas source 12 to the condenser 16. The air moving unit 14 may be a fan, a blower or the like, and may control the flow (e.g., the flow rate) of the process gas 26 to the condenser 16. The use of multiple air moving units 14 is also contemplated.

The condenser 16 may receive the process gas 26 from the air moving unit 14, and may condense the water vapor in the process gas 26 to output a partially (if not fully) dry gas 28. Various condenser types and configurations may be used, and use of a single stage or multi-stage condenser is also contemplated.

The condenser 16 may condense the water vapor in the process gas 26 by cooling the process gas 26. The heat extracted from the process gas 26 by the condenser 16 during cooling may be transferred to the heat transfer assembly 24 for further use, as is described in greater detail below.

Thus, the condenser 16 may lower the temperature of the process gas 26. In one manifestation, the condenser 16 may lower the temperature of the process gas 26 by at least 10° C. In another manifestation, the condenser 16 may lower the temperature of the process gas 26 by at least 20° C. In another manifestation, the condenser 16 may lower the temperature of the process gas 26 by at least 30° C. In another manifestation, the condenser 16 may lower the temperature of the process gas 26 by at least 40° C. In another manifestation, the condenser 16 may lower the temperature of the process gas 26 by at least 50° C. In another manifestation, the condenser 16 may lower the temperature of the process gas 26 by at least 100° C. In another manifestation, the condenser 16 may lower the temperature of the process gas 26 by at least 150° C. In yet another manifestation, the condenser 16 may lower the temperature of the process gas 26 by at least 200° C.

The water removed from the process gas 26 by the condenser 16 may be collected as a byproduct of the system 10. The collected water may then be used for any suitable purpose or discharged to a drain.

The desiccant chamber 18 may receive the partially dry gas 28 from the condenser 16, and may output a substantially dry gas 30. The desiccant chamber 18 may include a desiccant material selected to remove substantially all of the water remaining in the partially dry gas 28. Various inorganic or organic desiccant materials may be used, such as aluminas, silicas, zeolites, carbons, polymers, biomass, and the like. The use of other desiccant materials is also contemplated without departing from the scope of the present disclosure.

In one particular embodiment of the disclosed system 10, the desiccant material in the desiccant chamber 18 may be (or may include) an adsorbent material, such as a molecular sieve material. As one specific, non-limiting example, the desiccant (adsorbent) material may be configured as a monolithic body formed from a molecular sieve material with an alkali metal alumino-silicate structure that has an effective pore opening of at most about 5 angstroms (e.g., about 3 angstroms). As another specific, non-limiting example, the desiccant (adsorbent) material may be configured as a monolithic body formed from a zeolite material. As yet another specific, non-limiting example, the desiccant (adsorbent) material may be configured as a monolithic body formed from zeolite 3A.

The desiccant material may become exhausted after collecting a certain quantity of water and, therefore, may require regeneration. Regeneration of the desiccant material may be effected by applying heat to the desiccant material by way of the heat transfer assembly 24, as described in greater detail below. Other techniques, such as applying a vacuum, may also be used to regenerate the desiccant material. Combinations of techniques, such as heat and vacuum, are also contemplated.

The water removed from the partially dry gas 28 by the desiccant chamber 18 may be collected as a byproduct of the system 10. The collected water may then be used for any suitable purpose or discharged to a drain.

Thus, the condenser 16 and the desiccant chamber 18 may remove substantially all of the water originally contained in the process gas 26. The resulting dry gas 30 may then be used for carbon dioxide collection. One benefit of the disclosed system 10 is the cost effectiveness of carbon dioxide sequestration and collection where the ratio of water vapor to carbon dioxide in the dry gas 30 is equal or less than one by weight.

The contact chamber 20 may receive the dry gas 30 from the desiccant chamber 18, and may output a substantially carbon dioxide-free dry gas 32. The contact chamber 20 may include an adsorbent material that adsorbs carbon dioxide from the dry gas 30 by adhesion of carbon dioxide molecules from the stream of dry gas 30 to a surface of the adsorbent material. Further, during the adsorption process, the carbon dioxide may also be adsorbed into the internal structure of the adsorbent material, such as by diffusion or similar transport phenomena of the carbon dioxide molecules from the surface of the adsorbent material.

A variety of organic or inorganic adsorbent materials may be suitable for use in the contact chamber 20 to adsorb carbon dioxide from the dry gas 30, such as aluminas, silicas, zeolites, carbons, polymers, biomass, and the like. The use of other adsorbent materials is also contemplated.

In one particular embodiment of the disclosed system 10, the adsorbent material in the contact chamber 20 may be (or may include) a molecular sieve material. As one specific, non-limiting example, the adsorbent material may be configured as a monolithic body formed from a molecular sieve material with an alkali metal alumino-silicate structure that has an effective pore opening of about 8 to about 13 angstroms (e.g., about 10 angstroms). As another specific, non-limiting example, the adsorbent material may be configured as a monolithic body formed from a zeolite material. As yet another specific, non-limiting example, the adsorbent material may be configured as a monolithic body formed from zeolite 13X (or a modification of zeolite 13X).

When a sufficient amount of carbon dioxide has been adsorbed by the adsorbent material (onto and into the adsorbent material) within the contact chamber 20, a desorption process may be initiated to release the carbon dioxide from the adsorbent material. The process of desorbing the adsorbed carbon dioxide from the adsorbent material may regenerate the adsorbent material, thereby allowing further use of the adsorbent material.

The adsorbed carbon dioxide may be released from the adsorbent material using various techniques. One suitable technique for desorbing carbon dioxide from the adsorbent material involves subjecting the adsorbent material to vacuum. As one example, the contact chamber 20 may be substantially sealed to the flow of gas, and a vacuum may be drawn in the contact chamber 20. The pressure drop may be relatively low, such as about 8 to about 12 psi. As another example, the contact chamber 20 may be substantially sealed to the flow of gas and then the contact chamber 20 may be fluidly coupled to the optional vacuum chamber 22. Additionally (or alternatively), heat may be supplied to the contact chamber 20 and, ultimately to the adsorbent material, such as by way of the heat transfer assembly 24, to promote the release of the carbon dioxide from the adsorbent material. Therefore, the applied vacuum and/or heat may facilitate the release of carbon dioxide from the adsorbent material in the contact chamber 20, as shown by arrow 34.

Without being limited to any particular theory, it is believed that the use of vacuum regeneration may significantly reduce total energy requirements due to the relatively low pressure drops required to effect desorption, thereby rendering the disclosed physisorption process significantly efficient. For example, a physisorption process followed by vacuum desorption may require three to five times less energy for regeneration than a traditional chemisorption process. Using a monolithic structure, as disclosed herein, may further improve operating efficiency.

Optionally, the gaseous carbon dioxide (arrow 34) exiting the contact chamber 20 may transitioned to a solid using any suitable technique, such as by freezing or similar deposition. For example, a cooled surface 36, such as a cold finger, may be positioned downstream of the contact chamber 20 to make contact with the gaseous carbon dioxide (arrow 34). The cooled surface 36 may be cooled by a cryogenic pump 38 that circulates a cold liquid through the cooled surface 36. The cooled surface 36 may be cooled to a temperature that is sufficiently low to cause the gaseous carbon dioxide to solidify on the cooled surface 36.

The solidified carbon dioxide may then be collected, either as a solid or by transitioning the carbon dioxide back to a gas (i.e., sublimation) (e.g., with heat). The collected carbon dioxide may then be sent for storage or for transport to a job site.

The heat transfer assembly 24 may thermally couple the condenser 16 to one or more other subsystems of the system 10 to apply heat collected at the condenser 16 to the other subsystems of the system 10. As one example, the heat transfer assembly 24 may thermally couple the condenser 16 to the desiccant chamber 18. As another example, the heat transfer assembly 24 may thermally couple the condenser 16 to the contact chamber 20. As another example, the heat transfer assembly 24 may thermally selectively couple the condenser 16 to both the desiccant chamber 18 and the contact chamber 20.

The heat transfer assembly 24 may include a fluid line 50, a pump 52, heat exchangers 54, 56, 58 and an optional heat sink 60. The first heat exchanger 54 may be associated with the condenser 16, and may collect heat from the process gas 26 at the condenser 16. The second heat exchanger 56 may be associated with the desiccant chamber 18, and may transfer heat to the desiccant chamber 18, such as during regeneration of the desiccant material. The third heat exchanger 58 may be associated with the contact chamber 20, and may transfer heat to the contact chamber 20, such as during the desorption of carbon dioxide from the adsorbent material.

The fluid line 50 may fluidly couple the first heat exchanger 54 with the second and third heat exchangers 56, 58. The pump 52 may circulate a cooling fluid (e.g., water glycol or the like) through the fluid line 50 such that the cooling fluid collects heat from the first heat exchanger 54 and transfers the heat to one or more other subsystems of the system 10. For example, the cooling fluid may transfer collected heat to the desiccant chamber 18 by way of the second heat exchanger 56 or to the contact chamber 20 by way of the third heat exchanger 58.

A first valve 62 may be coupled to the fluid line 50 proximate the desiccant chamber 18 to control the flow of cooling fluid to the second heat exchanger 56. A bypass line 64 may be provided to bypass the second heat exchanger 56 when the first valve 62 is closed.

A second valve 66 may be coupled to the fluid line 50 proximate the contact chamber 20 to control the flow of cooling fluid to the third heat exchanger 58. A bypass line 68 may be provided to bypass the third heat exchanger 58 when the second valve 66 is closed.

Thus, the valves 62, 66 may be selectively actuated to control when heat is applied to the desiccant chamber 18 and contact chamber 20, respectively.

The fluid line 50 may also be in fluid communication with the heat sink 60. The heat sink 60 may remove residual heat from the cooling fluid before the cooling fluid is recirculated back through the heat transfer assembly 24. Heat transfer assemblies that do not recirculate cooling fluid are also contemplated.

Figure 2:
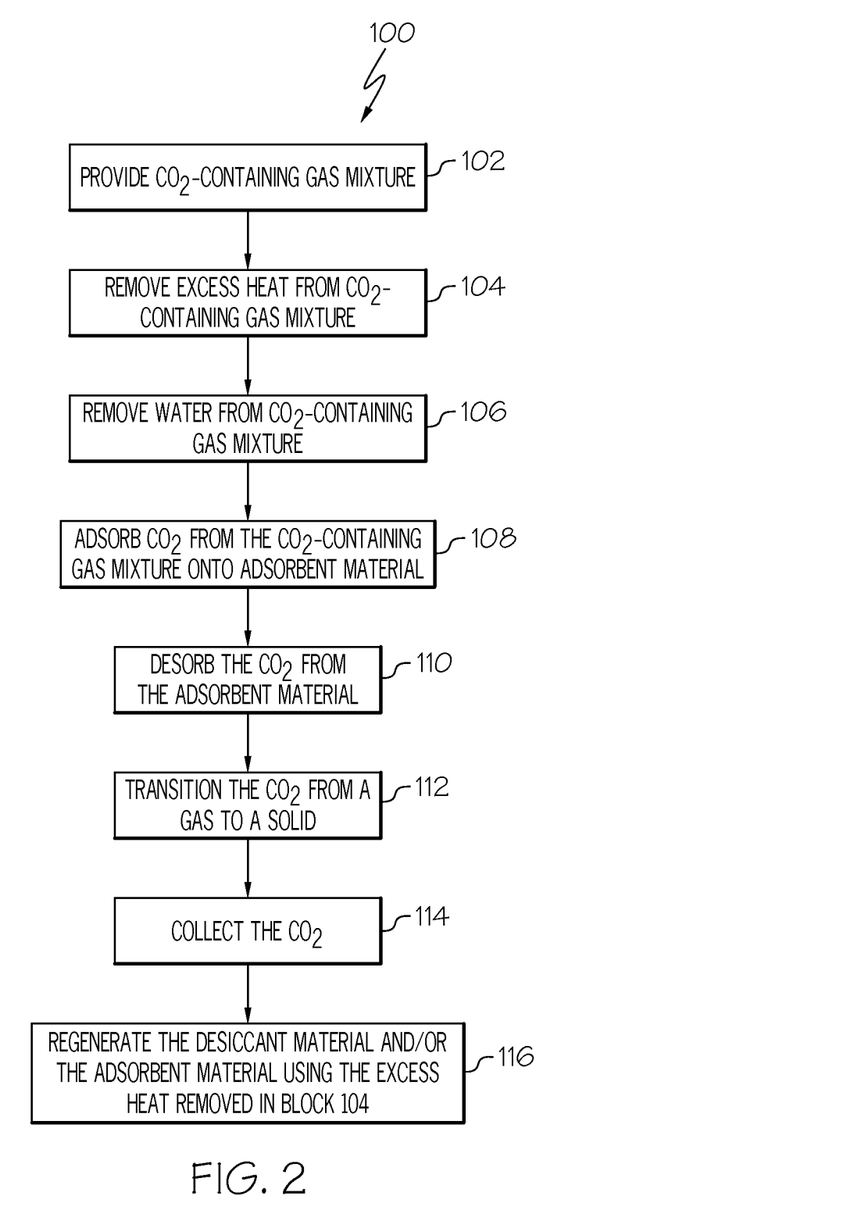
FIG. 2 is a flow chart illustrating an embodiment of the disclosed method for collecting carbon dioxide.

Referring to FIG. 2, also disclosed is a method, generally designated 100, for collecting carbon dioxide. The method 100 may begin at block 102 with the step of obtaining a carbon dioxide-containing gas. As described above, the carbon dioxide-containing gas may be the hot effluent from a power plant, such as a hydrocarbon-burning power plant. Use of other carbon dioxide-containing gases is also contemplated.

As shown at block 104, the excess heat may be removed from the carbon dioxide-containing gas. The excess heat may be removed at a condenser, which may also beneficially remove some (if not all) water vapor from the carbon dioxide-containing gas. Residual water may be removed from the carbon dioxide-containing gas using a desiccant, as shown at block 106, to yield a substantially dry carbon dioxide-containing gas.

Carbon dioxide from the dry carbon dioxide-containing gas may be adsorbed onto (and into) an adsorbent material, as shown at block 108. Then, as shown at block 110, adsorbed carbon dioxide may be desorbed from the adsorbent material, such as with heat and/or vacuum. The desorbed carbon dioxide may be transitioned into a solid, such as by freezing, as shown at block 112, and the carbon dioxide may be collected, as shown at block 114.

As shown at block 116, the excess heat removed from the carbon dioxide-containing gas at block 104 may be used to regenerate the desiccant and/or the adsorbent material. Applying the heat collected at block 104 to other subsystems is also contemplated.

Accordingly, the disclosed system 10 and method 100 may collect excess heat from a carbon dioxide-containing process gas—heat which must be removed anyway—and may use the collected heat in connection with one or more other subsystems, thereby reducing the overall energy needs of the systems and methods.

Figure 3:
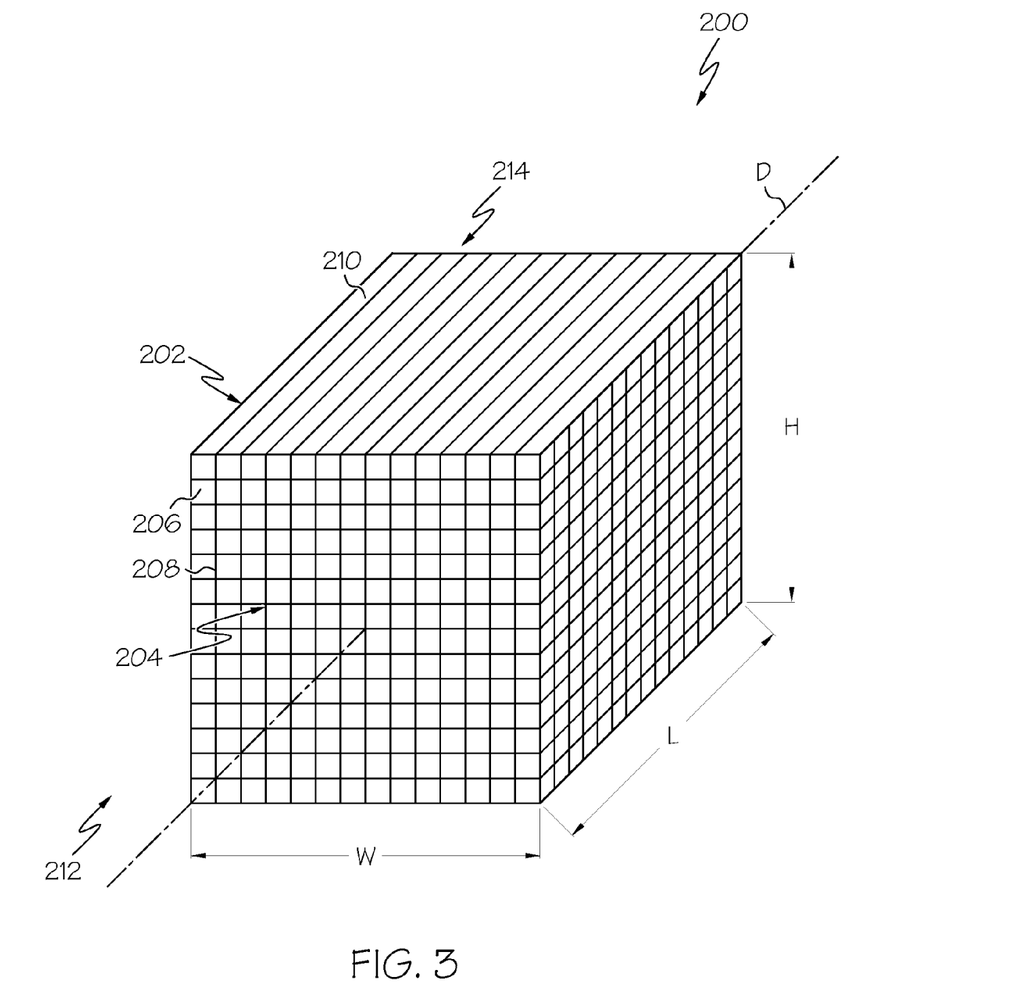
FIG. 3 is a perspective front view of an embodiment of the disclosed monolithic contactor.
Figure 4:
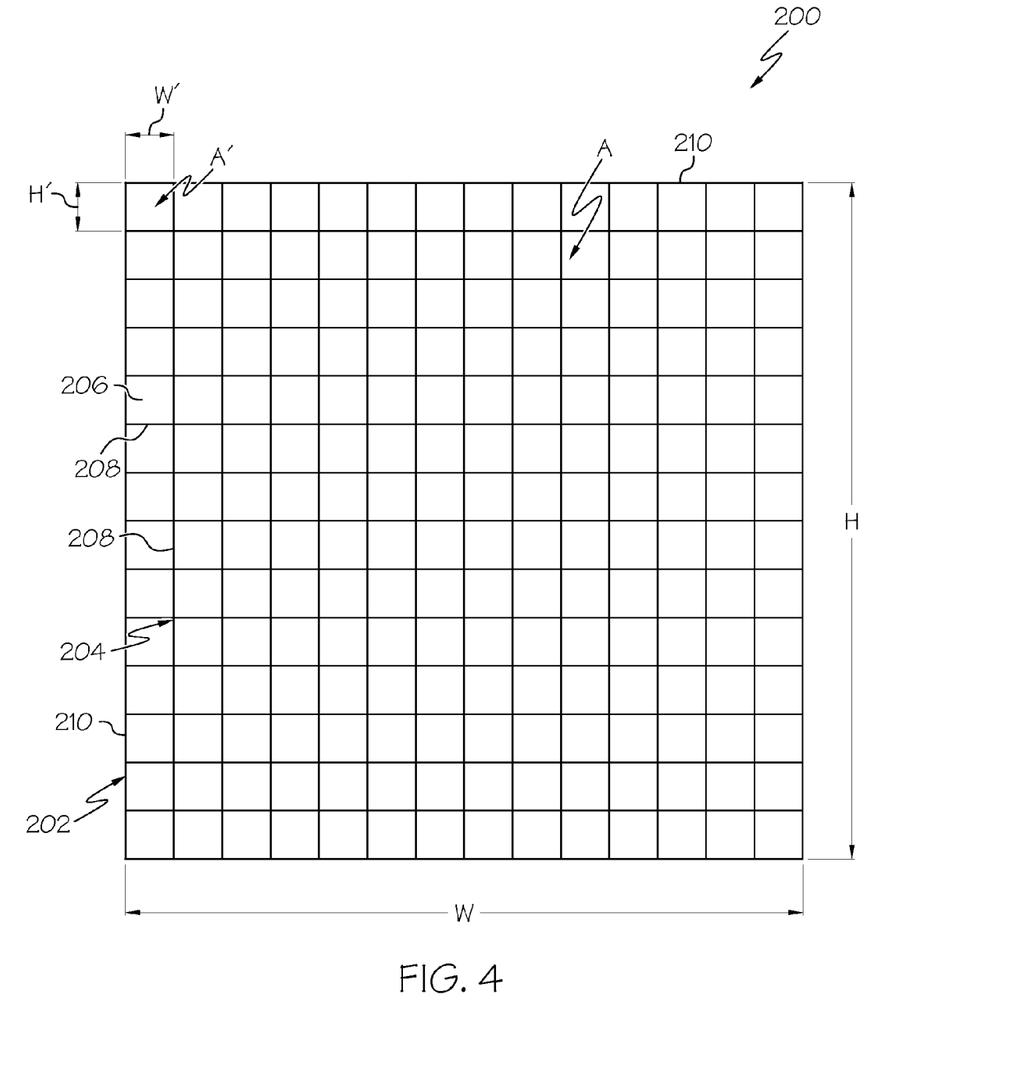
FIG. 4 is a front elevational view of the monolithic contactor of FIG. 3.

Referring to FIGS. 3 and 4, also disclosed is a monolithic contactor, generally designated 200, for adsorbing target molecules, such as carbon dioxide, water, or a combination of carbon dioxide and water. In one application, the monolithic contactor 200 may be used in the contact chamber 20 (FIG. 1) of the disclosed system 10 (FIG. 1). In another application, the monolithic contactor 200 may be used in the desiccant chamber 18 (FIG. 1) of the disclosed system 10 (FIG. 1).

The monolithic contactor 200 may include a monolithic body 202 that defines a plurality of channels 206. The channels 206 may be arranged as a honeycomb structure 204, wherein the channels 206 are defined by thin walls 208 of the monolithic body 202.

The monolithic contactor 200 may be formed from an adsorbent material. The adsorbent material may be a natural or synthetic dry adsorbent, such as a molecular sieve material (e.g., a zeolite material). The adsorbent material may be porous or nonporous. For example, the adsorbent material may be a natural or synthetic zeolite powder, which, as will be described in greater detail herein, may be bonded, molded, cast, or extruded to form the monolithic body 202. Adsorbent materials suitable for forming the monolithic contactor 200 are discussed above in connection with the desiccant materials used in the desiccant chamber 18 (FIG. 1) and the adsorbent materials used in the contact chamber 20 (FIG. 1).

Due to the monolithic contactor 200 being formed as a single monolithic body 202 of adsorbent material, such as a porous ceramic, a zeolite or other suitable adsorbent material (e.g., homogeneous adsorbent material), wear or degradation of the exterior surface 210 of the monolithic body 202 and the surfaces of the walls 208 may expose fresh zeolite material. Therefore, the monolithic contactor 200 may be, in a sense, a long-lasting self-sustaining system that requires relatively little maintenance or replacement to preserve performance.

In one embodiment, the monolithic contactor 200 may be formed from zeolite 3A or the like, where the number denotes the accessible pore size and the letter denotes the structure framework of the zeolite. A zeolite 3A monolithic contactor 200 (or multiple zeolite 3A monolithic contactors 200) may be used in the desiccant chamber 18 (FIG. 1) of the disclosed system 10 (FIG. 1) to primarily target and remove water molecules from a gas stream.

In another embodiment, the monolithic contactor 200 may be formed from zeolite 13X or the like, where the number denotes the accessible pore size and the letter denotes the structure framework of the zeolite. A zeolite 13X monolithic contactor 200 (or multiple zeolite 13X monolithic contactors 200) may be used in the contact chamber 20 (FIG. 1) of the disclosed system 10 (FIG. 1) to target and remove primarily carbon dioxide molecules from the gas stream.

At this point, those skilled in the art will appreciate that the adsorbent material used to form the monolithic contactor 200 may be selected based on the intended use (e.g., target molecule) of the monolithic contactor 200. The adsorbent material may be provided in a variety of pore openings, cavity, and channel sizes, and framework Si/Al ratio, depending upon the molecule targeted for adsorption.

Without being limited to any particular theory, target molecule(s) (e.g., carbon dioxide; water) may be held to the surface (including within the pores) of the monolithic body 202 by electrostatic forces (i.e., Van der Walls forces), which are physical bonds rather than chemical bonds. Therefore, due to the physical bonding of the target molecules to the monolithic body 202, the amount of energy required to free the carbon dioxide may be minimal compared to freeing the carbon dioxide from a chemical bond. As described above, desorption from the monolithic body 202 may be effected by heat and/or vacuum. The process of desorbing the adsorbed molecules from the monolithic body 202 may regenerate the monolithic body 202, thereby allowing further use of the monolithic contactor 200.

The monolithic body 202 may include an exterior surface 210, an inlet end 212 and an outlet end 214, and may be formed in various geometric shapes. As shown in FIG. 3, the monolithic body 202 may include a length L, a width W, and a height H.

As one non-limiting example, the monolithic body 202 may include a generally rectangular longitudinal shape having a length L substantially greater than the width W and the height H, and a generally rectilinear cross-sectional shape. As another non-limiting example, the monolithic body 202 may include a generally square longitudinal shape having a length L substantially equal to the width W and the height H, and a generally square cross-sectional shape having an equal width W and height H. Use of any other geometric longitudinal and cross sectional dimensions and shapes for the monolithic body 202 are also contemplated.

The channels 206 defined by the monolithic body 202 may be elongated channels, and may extend generally in parallel with the longitudinal axis D (FIG. 3) of the monolithic body 202. For example, the channels 206 may extend from proximate (i.e., at or near) the inlet end 212 of the monolithic body 202 to proximate the outlet end 214 of the monolithic body 202.

The inlet end 212 of the monolithic body 202 may have a cross-sectional area A (FIG. 4), which may be defined by the width W and the height H of the monolithic body 202. Likewise, the outlet end 214 of the monolithic body 202 may have a cross-sectional area, which may be defined by the width W and the height H of the monolithic body 202. While the inlet end 212 is shown as having substantially the same cross-sectional area A as the cross-sectional area of the outlet end 214, those skilled in the art will appreciate that the areas of the inlet and outlet ends 212, 214 may be different.

The channels 206 may be generally columnar channels extending through the length L of the monolithic body 202. As shown in FIG. 4, each channel 206 may have a width W' and a height H' defining an open area A'. Therefore, each channel 206 may have a square (or rectangular) profile in end view. However, other end profiles, such regular shapes (e.g., hexagonal, circular, ovular) and irregular shapes are also contemplated.

The cross-sectional area A of the monolithic body 202 may be sufficient to interrupt a flow of gas, thereby causing the gas to flow through the channels 206 from the inlet end 212 to the outlet end 214. As the gas flows across the monolithic body 202, it may come into contact with the exterior surface 210 and channels walls 208, thereby facilitating the adsorption.

In one variation, the channels 206 may be essentially linear passageways extending along the length L of the monolithic body 202 in order to allow passage of the flow of dry gas 30 (FIG. 1) from the inlet end 212, through the monolithic contactor 200, and out of the outlet end 214 as part of the contact chamber 20 (FIG. 1); or to allow the flow of partially dry gas 28 (FIG. 1) to pass through the monolithic contactor 200 as part of the desiccant chamber 18 (FIG. 1).

In another variation, the channels 206 may include non-linear passageways extending along the length L of the monolithic body 202. Channels 206 having non-linear passageways or changes in direction may increase the energy required to drive the flow of gas through the monolithic contactor 200 and may increase the pressure drop. It can be appreciated by one skilled in the art that the variance in linear characteristics of the longitudinal passageway formed by the channels 206 may depend on various factors, including the desired flow rate or pressure drop of the gas stream through the monolithic contactor 200 along the longitudinal axis D.

Compared to non-linear channels, particular advantages of linearly extending channels 206 (e.g., axially along the longitudinal direction D) are that less energy is required to drive the flow of gas through the monolithic contactor 200 and a reduced pressure drop as the gas flows through the channels 206 along the longitudinal direction D.

The channels 206 may be adjacently arranged and may extend in parallel along the longitudinal axis D (FIG. 3) of the monolithic body 202. The number of channels 206 per unit of cross-sectional area (e.g., the channel density) may vary depending on various factors, such as flow rate. In one expression, the monolithic body 202 may include at least about 10 channels 206 per square inch (in end view) of the monolithic body 202. In another expression, the monolithic body 202 may include at least about 20 channels 206 per square inch. In another expression, the monolithic body 202 may include at least about 50 channels 206 per square inch. In another expression, the monolithic body 202 may include at least about 100 channels 206 per square inch. In another expression, the monolithic body 202 may include about 20 to about 500 channels 206 per square inch. In yet another expression, the monolithic body 202 may include about 100 to about 400 channels 206 per square inch.

In general, the honeycomb structure 204 (FIG. 4) of the monolithic body 202 may provide a predetermined matrix of channels 206, such that the passageways extending through the channels 206 may be consistent and controlled. The use of a monolithic structure, as well as the consistent geometry of the matrix of channels 206 and minimization of obstructions, allows for the flow rate and pressure drop through the monolithic contactor 200 and, thus, the energy required for driving the gas stream to be controlled by design. This is in stark contrast to the use of packed beds of adsorbent pellets used to adsorb carbon dioxide, which typically require significantly more energy for driving the gas stream through random voids through the packed pellets.

It can be appreciated by one skilled in the art that the shape of the monolithic body 202 and shape, dimensions, and configuration of the channels 206 may be optimized to maintain the greatest surface area for adsorbing carbon dioxide and minimizing flow obstruction through the monolithic contactor 200. Without being limited to any particular theory, it is believed that the surface area-to-volume ratio achieved using a monolithic body 202 is advantageous over and may not be achieved using other materials (suspended amines) or configurations (packed beds). Therefore, systems employing the disclosed monolithic body 202 may have a relatively small footprint compared to systems using other materials and configurations.

Optimizing the dimensions, shape, and configuration of the monolithic body 202 and the channels 206 may enable large quantities of carbon dioxide (or other target molecule) to be adsorbed while minimizing the overall footprint and the power/energy needed to drive the gas stream around and through the monolithic contactor 200, such as by the air moving unit 14 (FIG. 1), thus minimizing operational costs. Therefore, the combination of using a physisorption process followed by vacuum desorption, which may require significantly less energy for regeneration than traditional chemisorption processes, with the low pressure drop associated with the monolithic structure, may significantly reduce total energy costs and the overall footprint of the system.

The structural configuration and shape of the monolithic contactor 200 may also include a high structural integrity due to the honeycomb structure 204 of the monolithic body 202, such that the monolithic contactor 200 may be stable under a wide variety of temperature, pressure, and environmental conditions.

Figure 5:
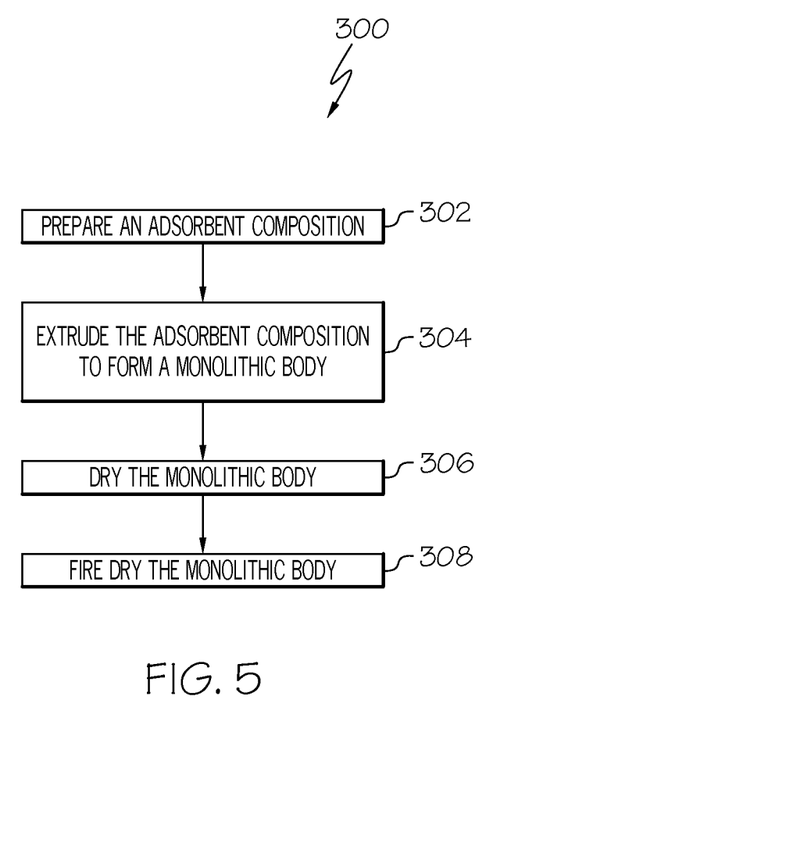
FIG. 5 is a flow chart illustrating an embodiment of the disclosed method for making a monolithic contactor.

Referring to FIG. 5, also disclosed is a method, generally designated 300, for making a monolithic contactor. The method 300 may generally include the step of bonding, molding or extruding a natural or synthetic adsorbent composition into a cohesive monolithic body. The method 300 may begin at block 302 with the step of preparing and providing an adsorbent composition. As shown in block 304, the adsorbent composition may be passed through (e.g., pushed or drawn through) a die of an extruder having a cross-section matching a designed shape and configuration to create an extruded monolithic body which forms the monolithic contactor. As shown in block 306, the extruded monolithic body may be allowed to dry to a green state. As shown in block 308, the dried monolithic body may be fired (i.e., fire dried), such as in a kiln. For example, the dried monolithic body may be fired by slowly ramping the temperature up to 700° C. and then maintaining at 700° C. for thirty (30) minutes. Various other firing temperatures and times may be used.

The adsorbent composition may include a carrier, a binder, and an adsorbent material. For example, the adsorbent material may be a zeolite material. The zeolite material may be zeolite 3A, zeolite 13X or the like. In one expression, the adsorbent material may be in powdered form. The carrier may be any suitable liquid material used to suspend the zeolite material and add moisture, such as water, alcohol, water and alcohol, and the like. The type of carrier may vary depending upon the viscosity needs of the form needed, for example for casting, slipcasting, or extrusion. The binder may be silica, alumina, phosphates, or any other suitable binder. Once dried and fired, the binder may provide bridges and crosslinks between the zeolite particles by sintering the particles together.

Alternatively, the carrier and binder may be provided as a single component of the adsorbent composition where the binder may be suspended within a liquid carrier. For example, the binder/carrier system may be colloidal silica, colloidal alumina or the like. Use of other binder/carrier systems is also contemplated.

The use of water-soluble colloidal silica as the binder may surround and permeate the zeolite particles. The binder may be of suitable concentration in order to provide increased strength to the monolithic contactor while not compromising the physical properties of the zeolite material, such as loss of porosity or a decrease in adsorbent properties.

The use of water-soluble colloidal silica with small additional amounts of phosphate as the binder may provide a suitably durable and robust monolithic contactor that can sustain testing and be cycled multiple times without degradation in adsorption efficiency. The phosphate may be used to assist the colloidal silica in sintering while retaining the zeolite powder's material characteristics, such as pore shape, without loss in efficiency (i.e., ability to adsorb carbon dioxide). Additionally, phosphate additives may provide higher strength to the monolithic contactor than a silica binder alone.

It is contemplated that a monolithic contactor formed from zeolite 13X may be capable of adsorbing (i.e., collecting) eighty (80) percent or more of the available carbon dioxide from the gas stream having a carbon dioxide concentration of at least ten (10) percent.

Figure 6:
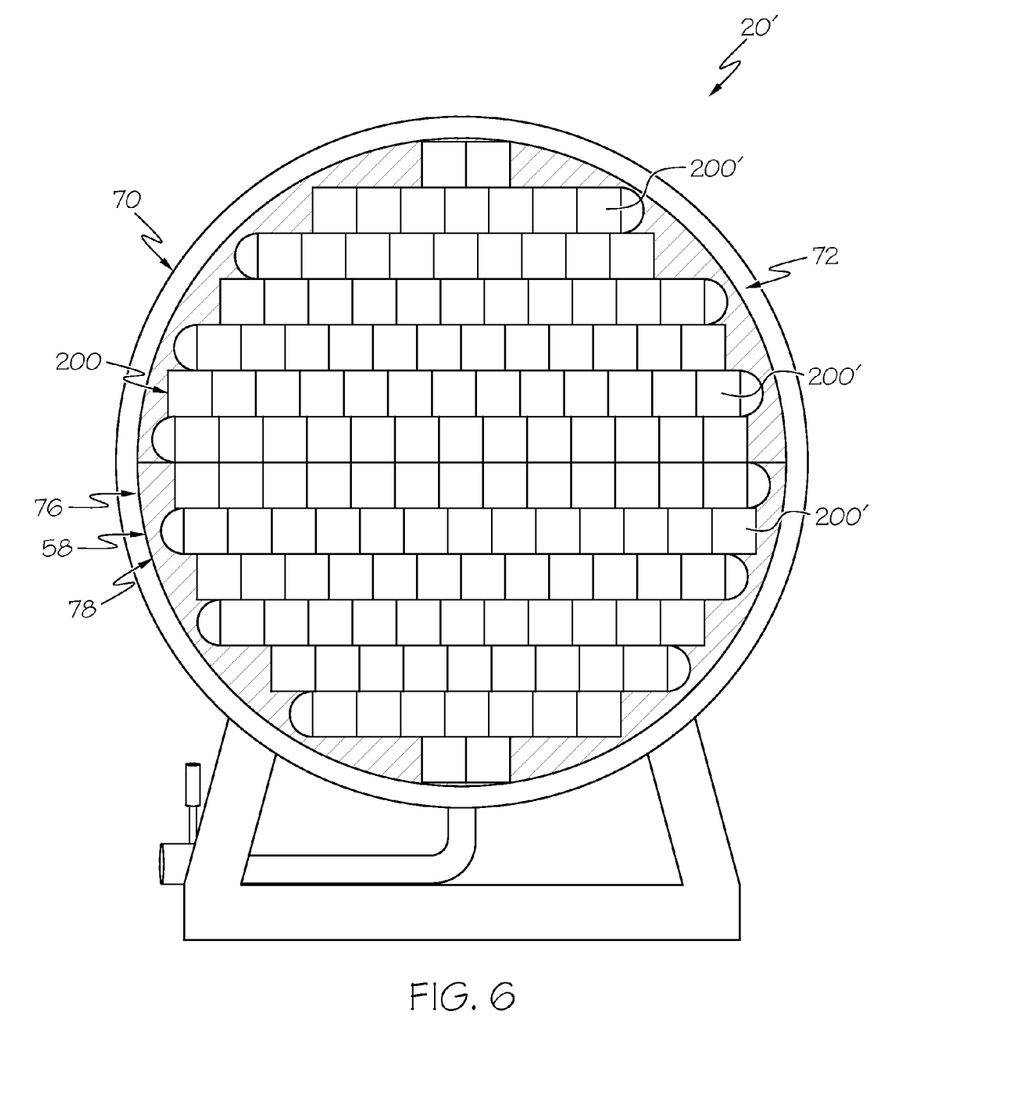
FIG. 6 is a cross-sectional view of a contact chamber of the disclosed system for collecting carbon dioxide.

Referring to FIG. 6, in another embodiment of disclosed system 10 shown in FIG. 1, a plurality of monolithic contactors 200 may be stacked, grouped, or otherwise assembled in a vessel to form either the desiccant chamber 18 (FIG. 1) or the contact chamber 20 (FIG. 1). The robust nature of the monolithic body 202 may allow a plurality of monolithic contactors 200 to support the weight of additionally stacked pluralities of monolithic contactors 200. In such an assembly, a particular monolithic contactor 200 or series of monolithic contactors 200 may be removed or replaced individually or as a group as necessary. FIG. 6 illustrates one embodiment of the contact chamber 20 (FIG. 1) of the system; however, it can be appreciated that the desiccant chamber 18 (FIG. 1) may be constructed in a substantially similar manner.

A contact chamber 20' may include a holding vessel 70, such as a tank, having sidewalls 72 and a hollow internal volume 74. A plurality of monolithic contactors 200' may be stacked or grouped into an array within the internal volume 74. One or more heat exchangers 58 may be disposed within and throughout the internal volume 74. Optionally, the heat exchangers 58 may be in direct contact with one or more of the monolithic contactors 200'. For example, the heat exchangers 58 may be heat tape, film heaters, strip heaters, clamp-on heaters, or the like. In one implementation, the heat exchangers 58 (e.g., a strip heater) may be wrapped around the exterior surface of each monolithic contactor 200'. In another implementation, the heat exchanger (e.g., a strip heater) may be sandwiched between stacked rows or stacked columns of monolithic contactors 200', thus forming a layered heating configuration. Optionally, a filler 76 may be disposed within the internal volume 74 and surrounding the plurality of monolithic contactors 200'. The filler 76 blocks the flow of gas and prevents a high flow of gas around one or more of the monolithic contactor 200'. Thus, the majority of the flow of gas is forced over the exterior of the monolithic contactor 200 and through the channels 206 (FIG. 4) to increase adsorption. As one example, the filler 76 may be a wood frame or wood filler. As another example the filler 76 may be an inert material, such as a ceramic material. In one implementation, the ceramic material may be cut or otherwise shaped to adequately fill gaps between monolithic contactors 200' and the vessel 70 (e.g., a shaped ceramic filler). The filler 76 may also stabilize the stacked array of monolithic contactors 200. Optionally, the filler 76 may provide thermal insulation to the contact chamber 20'.

Optionally, plug fillers 78 may be applied to or around the heat exchangers 58 or between the heat exchangers 58 and one or more of the monolithic contactors 200'. The plug fillers 78 block the flow of gas and prevent a high flow of gas around one or more of the monolithic contactors 200'. Thus, the majority of the flow of gas is forced over the exterior of the monolithic contactor 200 and through the channels 206 (FIG. 4) to increase adsorption. As one example, the plug fillers 78 may be a wood. As another example the plug fillers 78 may be an inert material, such as a ceramic material. In one implementation, the ceramic material may be cut or otherwise shaped to adequately fill gaps between monolithic contactors 200' and heat exchangers 58 (e.g., a shaped ceramic plug fillers).

It can be appreciated by one skilled in the art that when the above-described configuration is used as the contact chamber 20 (FIG. 1) of system 10 (FIG. 1), the monolithic contactors 200 may be formed using zeolite 13X to adsorb carbon dioxide molecules. It can also be appreciated by one skilled in the art that when the above-described configuration is used as the desiccant chamber 18 (FIG. 1), the monolithic contactors 200 may be formed by zeolite 3A to adsorb water molecules.

Although various aspects of the disclosed system and method have been shown and described, modifications may occur to those skilled in the art upon reading the specification. The present application includes such modifications and is limited only by the scope of the claims.

What is claimed is:

1. A method for making a monolithic contactor comprising:
    preparing an adsorbent composition comprising a carrier, a binder, and an adsorbent material, wherein said adsorbent material comprises a zeolite material and said binder comprises phosphate and water-soluble colloidal silica;
    shaping said adsorbent composition into a monolithic body that defines a plurality of channels;
    drying said monolithic body; and
    fire drying said dried monolithic body.

2. The method of claim 1 wherein said adsorbent material comprises zeolite 13X.

3. The method of claim 1 wherein said adsorbent material comprises zeolite 3A.

4. The method of claim 1 wherein said carrier is a liquid.

5. The method of claim 1 wherein said carrier comprises at least one of water and alcohol.

6. The method of claim 1 wherein said preparing comprises:
    suspending said binder in said carrier to form a binder/carrier system; and
    mixing said binder/carrier system with said adsorbent material to form said adsorbent composition.

7. The method of claim 6 wherein said adsorbent material is in powdered form prior to said mixing.

8. The method of claim 1 wherein said shaping comprises extruding said adsorbent composition.

9. The method of claim 1 wherein said plurality of channels are substantially linear.

10. The method of claim 1 wherein said plurality of channels have a channel density of at least 50 channels per square inch.

11. The method of claim 1 wherein said plurality of channels have a channel density of at least 100 channels per square inch.

12. The method of claim 1 wherein said plurality of channels have a channel density ranging from about 20 to about 500 channels per square inch.

13. The method of claim 1 wherein said plurality of channels have a channel density ranging from about 100 to about 400 channels per square inch.

14. The method of claim 1 wherein said fire drying comprises ramping said monolithic body up to a firing temperature and maintaining said monolithic body at said firing temperature for a pre-determined minimum amount of time.

15. The method of claim 1 wherein said plurality of channels continuously extend through said monolithic body.

16. A method for making a monolithic contactor comprising:
    preparing an adsorbent composition comprising a carrier, a binder, and a zeolite material, wherein said binder comprises phosphate and water-soluble colloidal silica;
    extruding said adsorbent composition to form a monolithic body having an inlet end and an outlet end, said monolithic body defining a plurality of channels continuously extending through said monolithic body from said inlet end to said outlet end, said plurality of channels have a channel density of at least 100 channels per square inch;
    drying said monolithic body; and
    fire drying said dried monolithic body.

17. The method of claim 16 wherein said adsorbent material comprises zeolite 13X.

18. The method of claim 16 wherein said adsorbent material comprises zeolite 3A.

19. The method of claim 16 wherein said channel density ranging from 100 channels per square inch to about 400 channels per square inch.

20. The method of claim 16 wherein said preparing comprises:
    suspending said binder in said carrier to form a binder/carrier system; and
    mixing said binder/carrier system with said zeolite material to form said adsorbent composition.

* * * * *